United States Patent [19]
Braun et al.

[11] Patent Number: 6,105,630
[45] Date of Patent: Aug. 22, 2000

[54] ELECTRICAL ROTATING ACTUATOR FOR FORMING A WEAVING LOOM SHED

[75] Inventors: Dominique Braun, Faverges; Pierre Bourgeaux, Poisy; Patrick Iltis, Saint Jorioz, all of France

[73] Assignee: Staubli Faverges, Faverges, France

[21] Appl. No.: 09/218,299

[22] Filed: Dec. 22, 1998

[30] Foreign Application Priority Data

Dec. 24, 1997 [FR] France ................... 97 16734

[51] Int. Cl.⁷ .................. D03C 3/20; H02K 1/27
[52] U.S. Cl. .............. 139/455; 139/66 R; 139/76; 310/156; 310/254
[58] Field of Search .................. 310/254, 156, 310/266, 49 R; 139/455, 66 R, 76

[56] References Cited

U.S. PATENT DOCUMENTS

| | | | |
|---|---|---|---|
| 3,852,627 | 12/1974 | Davis | 310/13 |
| 4,785,213 | 11/1988 | Satake | 310/116 |
| 5,069,256 | 12/1991 | Goodman. | |
| 5,070,266 | 12/1991 | Janczak et al.. | |
| 5,631,010 | 5/1997 | Muller | 310/156 |

FOREIGN PATENT DOCUMENTS

| | | |
|---|---|---|
| 0 926 283 | 12/1989 | European Pat. Off.. |
| 0353005 | 1/1990 | European Pat. Off.. |
| 0447257 | 9/1991 | European Pat. Off.. |
| 0750061 | 12/1996 | European Pat. Off.. |
| 61010952 | 5/1986 | Japan. |
| 61167360 | 12/1986 | Japan. |
| 09268450 | 10/1997 | Japan. |
| WO9517035 | 6/1995 | WIPO. |
| WO9733024 | 9/1997 | WIPO. |

*Primary Examiner*—Andy Falik
*Attorney, Agent, or Firm*—Dowell & Dowell, P.C.

[57] ABSTRACT

An electrical rotating apparatus for controlling a harness cord associated with the shed of a weaving loom which includes an actuator including a rotor and a stator. The rotor is formed of at least two permanent magnets which are mounted within a tube so as to be spaced axially with respect to one another and wherein a plurality of stator elements are also provided offset axially relative to an axis of rotation of the rotor such that each of the plurality of rotors corresponds with a separate one of the plurality of stators. The polarities of one or the other of the permanent magnets or the stator elements are offset angularly relative to the axis of rotation.

19 Claims, 4 Drawing Sheets

ELECTRICAL ROTATING ACTUATOR FOR FORMING A WEAVING LOOM SHED

FIELD OF THE INVENTION

The present invention relates to an electrical actuator for forming the shed in a weaving loom, particularly for controlling the harness cords of a weaving system of the Jacquard type or the frames of a dobby. The invention also relates to a weaving system comprising such an actuator, and to a weaving loom equipped with such a system.

DISCUSSION OF THE RELATED ART

In weaving systems of the Jacquard type, it is known to drive, in phase opposition, two frames each bearing a plurality of griffes or horizontal knives adapted to displace, vertically, hooks connected to the harness cords by a pulley or block mechanism. Mechanical or electromechanical devices are provided to immobilize these hooks along their vertical stroke. This known type of device necessitates considerable power for maneuvering the griffe frames, which power is furnished by the drive shaft of the weaving loom, this leading to the loom being overdimensioned.

It is also known to use a rotating motor such as a step motor or a servo-motor for linearly controlling a small cord belonging to a weaving loom. Taking into account the large number of electric motors used in the weaving system associated with a weaving loom, a number which may attain and even exceed 10,000, these motors must require minimum space requirement and be cost effective, while offering considerable reliability. In particular, such a rotating electric motor must be able to stop and restart in any position corresponding to the normal stroke of the harness cord in order to be compatible with the different types of shed, straight or oblique, desired by the user. In addition, in order to avoid too great a consumption of current, these motors must have a low inertia as they are subject to frequent and rapid starts, stops and stroke reversals.

It is an object of the present invention to propose a rotating electrical actuator adapted to control the displacement of one or more harness cords, which is compact, capable of rotating whatever its stopped position, and minimum price and low inertia.

SUMMARY OF THE INVENTION

To that end, the invention relates to an electrical rotating actuator for forming the shed on a weaving loom, particularly for controlling the harness cords of a weaving system of Jacquard type, comprising a rotor and a stator, characterized in that the stator is formed by at least two stator elements offset along the axis of rotation of the rotor and in that an rotor is formed by a tube containing at least two permanent magnets, polarized diametrally, and offset axially in the tube, each magnet being disposed in an air gap of a stator element.

The electrical rotating actuator according to the invention is compact and easy to manufacture insofar as the rotor may be essentially formed by a tube and by magnets of overall cylindrical form which are simple parts. In addition, the structure of the rotor formed by a tube and two magnets involves low inertia as the diameter of the rotor may be reduced, for example less than 5 mm.

According to a first embodiment of the invention, the stator elements are overall aligned and the polarities of the permanent magnets are offset angularly. The fact that the polarities of the permanent magnets are offset makes it possible, whatever the position of the rotor, for at least one of the magnets to be in a position such that the activation of the corresponding stators induces on a magnet, and therefore on the rotor, an electromagnetic force not parallel to the direction of polarization of the element for in rotation of the rotor. In other words, the two magnets, whose polarities are offset angularly, cannot be located simultaneously in a position in which the electromagnetic field generated by the stator elements, which are aligned, does not have a mechanical influence on the rotor.

According to an advantageous aspect of the invention, corresponding to a first preferred embodiment, the permanent magnets have polarities offset by about 60 to 120°, preferably 90°, in the case of a two-phase actuator, or by about 90 to about 150°, preferably 120°, in the case of a three-phase actuator. This geometrical configuration guarantees that, in the case of a two-phase actuator with polarities of magnets offset by 90°, at least one of the magnets is oriented with an angle greater than or equal to 45° with respect to the direction of the electromagnetic forces generated in the air gap of the stators. In the case of a three-phase actuator, at least two of the magnets are oriented with an angle greater than or equal to 30° with respect to this direction.

According to a second embodiment of the invention, it may be provided, by a reversal of structure with respect to the first embodimnet of the invention, that the permanent magnets have overall aligned polarities, while the stator elements are offset angularly. In that case, an effect is obtained similar to the one obtained with the first embodiment, i.e. the fact that the activation of the stators results in the rotation of the rotor whatever their position stopped.

According to an advantageous aspect of the invention, corresponding to a preferred embodiment, the stator elements are then offset angularly by about 60 to about 120°, preferably 90° in the case of a two-phase actuator, or by about 90 to about 150°, preferably 120° in the case of a three-phase actuator.

According to another advantageous aspect of the invention, the actuator comprises means for axially spacing the magnets apart inside the tube of the rotor. These axial spacing means guarantee an adequate positioning of the permanent magnets with respect to the air gaps of the corresponding stators.

According to another advantageous aspect of the invention, the rotor bears a member adapted to cooperate with a braking device and/or an angular position detecting device. This aspect of the invention makes it possible to control the actuator according to the invention with precision, in particular thanks to a safety brake allowing the actuator to be maintained in a determined position when it is not activated, and/or to a position coder.

According to another advantageous aspect of the invention, the magnets and/or the member adapted to cooperate with a braking device are immobilized in rotation with respect to the tube, for example glued or force-fitted therein. This guarantees an efficient transmission to the tube of the couple exerted by the stators on the rotors and an adequate positioning of the different constituents of the magnetic circuit, and/or an efficient braking.

From the standpoint of production, the magnets are particularly simply substantially cylindrical. In addition, it may be provided that at least one support bearing of the rotor is formed by a ball bearing.

The invention also relates to a weaving system which comprises one or more actuators as described hereinbefore and to a weaving loom equipped with such a system. This system is simpler to employ and maintain than the prior art devices and allows a wire-to-wire control of a Jacquard loom harness. The yield of a weaving loom according to the invention is therefore substantially improved with respect to the known art.

BRIEF DESCRIPTION OF THE DRAWINGS

The invention will be more readily understood on reading the following description of an embodiment of an electrical rotating actuator in accordance with its principle, given solely by way of example and with reference to the accompanying drawings, in which.

DESCRIPTION OF PREFERRED EMBODIMENT

Figure 1:
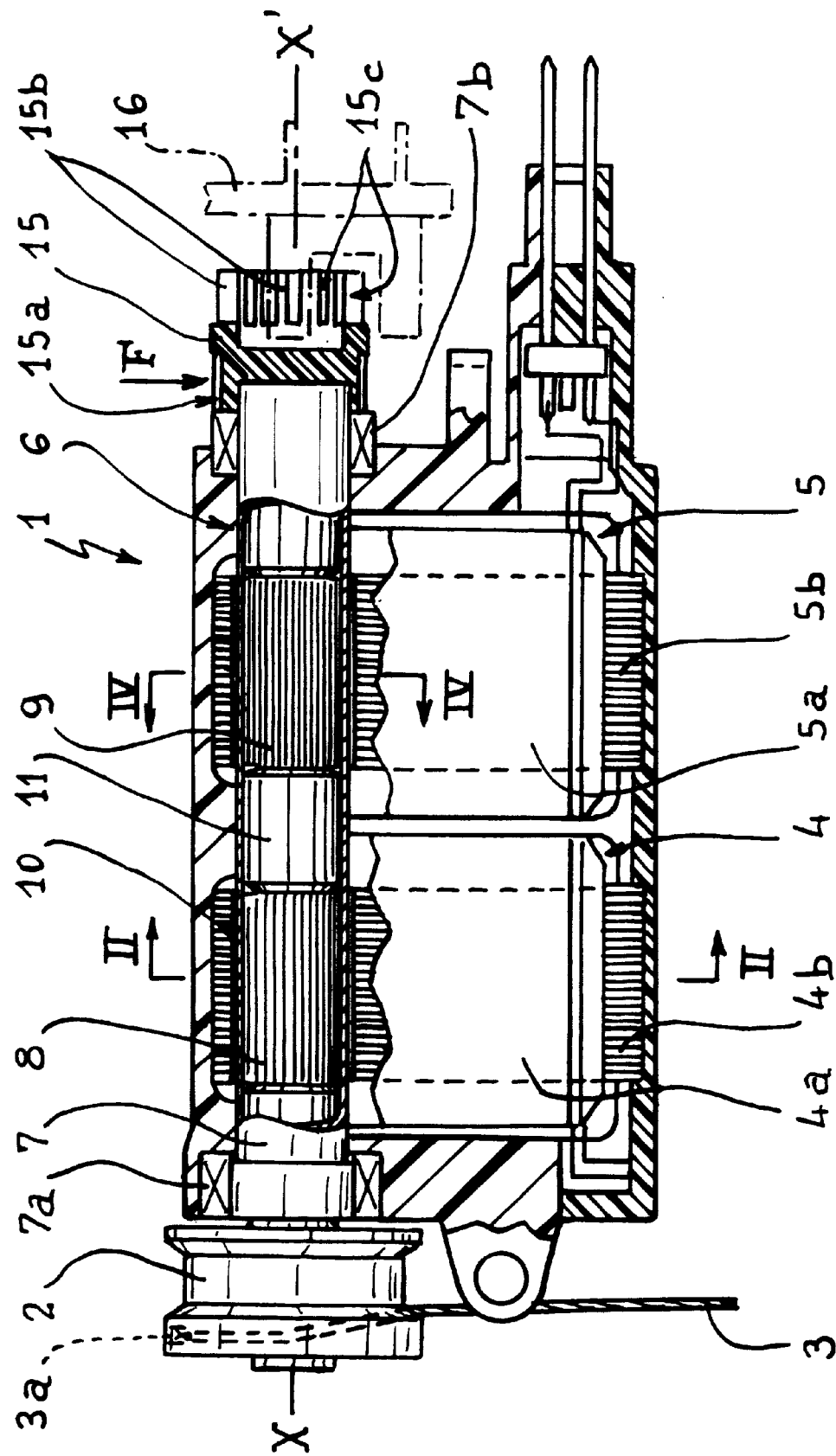
FIG. 1 is a longitudinal section through an actuator according to the invention.
Figure 2:
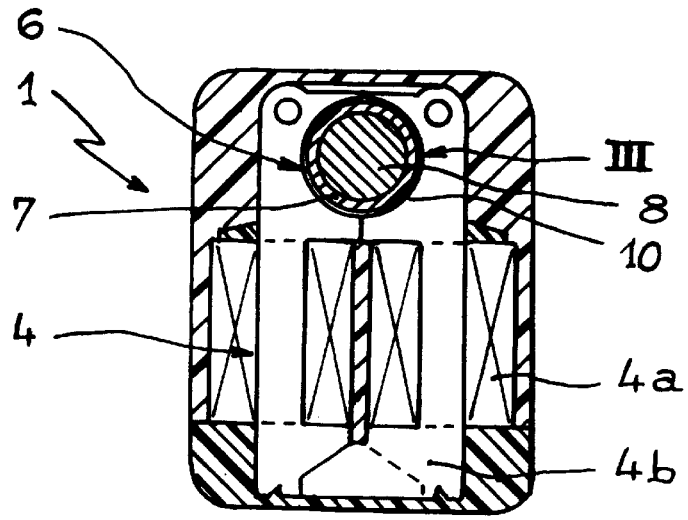
FIG. 2 is a transverse section along line II—II of FIG. 1.

Referring now to the drawings, and firstly to FIG. 1, the electrical rotating actuator 1 is intended to ensure winding, on a pulley 2, of a harness cord 3 connected to one or more warp yarns of a weaving system of Jacquard type. The actuator 1 is a two-phase actuator. It comprises a stator formed by two stator elements 4 and 5 offset in a direction defined by axis XX'. These elements 4 and 5 are overall aligned and adapted to cooperate with a rotor 6 formed by a tube 7 centered on the axis XX'. The tube 7 is preferably made of a magnetic material, such as for example brass. The tube 7 is supported in the body of the actuator I by two bearings 7a and 7b formed by ball bearings. The use of ball bearings allows an excellent yield in rotation. The tube 7 contains two permanent magnets 8 and 9, of substantially cylindrical shape, offset along axis XX' and disposed opposite the two stator elements 4 and 5. These elements 4 and 5 comprise windings 4a and 5a of electrically conducting wire, such as copper wire, wound around the stacks 4b and 5b of magnetically conducting plates. The shape of the stacks 4b and 5b is such that they form a circular housing 10 for receiving the tube 7. The shape of the housing 10 defines the air gap of the stator elements 4 and 5 with respect to the rotor 6.

Figure 3:
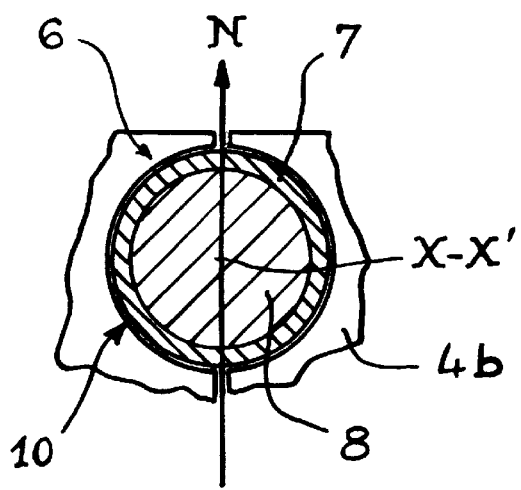
FIG. 3 is a view on a larger scale of detail III of FIG. 2.
Figure 4:
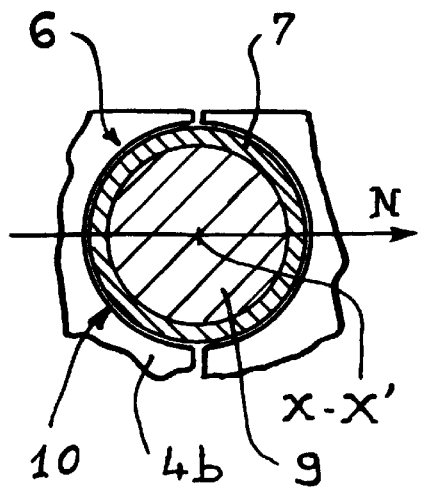
FIG. 4 is a section similar to FIG. 3 in the plane of line IV—IV of FIG. 1.

As is more clearly visible in FIGS. 3 and 4, the magnets 8 and 9 have polarities offset angularly by about 90°. In this way, at least one of the magnets 8 or 9 is permanently in an orientation such that the electromagnetic force created in the housing 10 is such as to exert a couple on the rotor 6, as at least one of the magnets 8 or 9 does not have its North-South line parallel to this force.

The rotating actuator according to the invention may function efficiently when the two magnets 8 and 9 have polarities oriented differently, the value of the angle of shift being able in principle to be included between 0 and 180°. In practice, it is included between 60 and 120°. However, the value of 90° presents the additional advantage that it makes it possible to obtain the best electromagnetic yield and an optimalized start whatever the position of the actuator.

A spacer element 11 is disposed inside the tube 7 between the magnets 8 and 9 which are fixed in rotation with resepect to the tube 7, for example glued or force-fitted in the tube. This spacer is inserted in the tube 7 when the rotor 6 is being manufactured, so as to wedge the magnets 8 and 9 axially. However, other means for axially spacing the magnets 8 and 9 inside the tube 7 may be envisaged, such as for example a pair of inner flanges obtained by molding, machining or shrinking inside the tube 7, elastic washers fixed by expansion inside the tube or points directed towards the inside of the tube.

The tube 7 bears, at the end opposite pulley 2, a dish 15 provided with at least one notch 15a on its outer radial surface. The dish 15 may be glued or force-fitted on the tube 7. A wedging or braking force F may be applied on the dish 15 in manner substantially perpendicular to the axis of rotation X–X' of the rotor 6. This force F may be applied by any suitable means, while the notch 15a allows the dish 15 and the tube 7 to be blocked in position. Furthermore, the dish 15 has teeth 15b cut out therein, extending parallel to the axis X–X' and defining slots 15 c therebetween. The succession of the teeth 15b and of slots 15c allows a detector 16, of optical, infrared or equivalent type, to locate the orientation of the dish 15 and the rotor 6 about axis X–X'. The detector 16 is connected to a logic unit for controlling supply of the windings 4a and 5a, with the result that the detector-coder 16 allows the rotation of the rotor 6 about axis X–X' to be monitored.

The actuator according to the invention is very satisfactory as far as cost price is concerned and have a low inertia. A large number may therefore be mounted on a Jacquard type system for forming the shed on a weaving loom.

Figure 5:
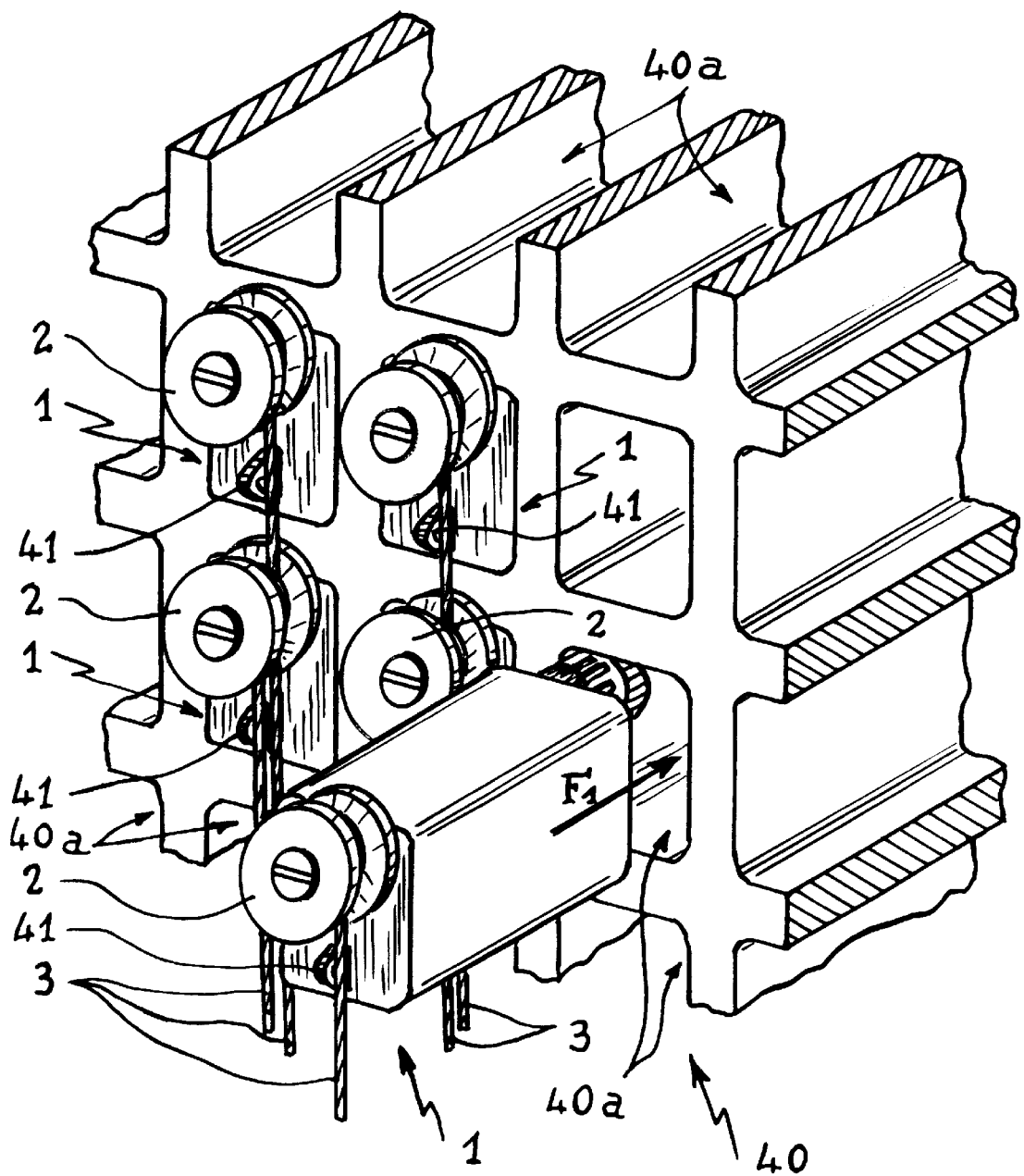
FIG. 5 illustrates an example of positioning of the actuator of FIG. 1.

The actuator according to the invention may advantageously be installed as a bank, as is visible in FIG. 5, i.e. by disposing a large number of actuators side by side inside a structure 40 defining compartments 40a for receiving the actuators. The actuators are inserted in the compartments 40a in a direction $F_1$ and may be removed therefrom thanks to a pierced tab 41 provided on their front face.

The different coders 16 and the corresponding braking system may be provided on the rear of the structure 40.

The use of ball bearings allows a precise guiding of the tube 7, which guarantees the constancy and precision of the air gap between the stators 4 and 5 and the magnets 8 and 9. The assembly made thanks to bearings 7a and 7b is rigid, with the result that the positioning of the pulley is conserved, even in the case of intense pull on the harness cord 3, while the dish 15 is always positioned correctly with respect to the detector 16.

Figure 6:
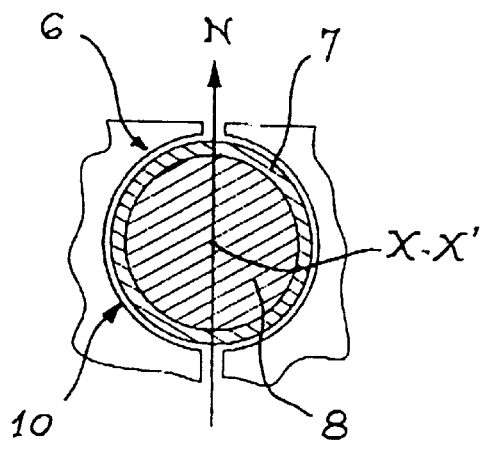
FIGS. 6–8 are cross sectional views similar to FIGS. 3 and 4 showing three permanent magnets and showing the angular offset relationship of the poles of the three permanent magnets when the invention is utilized with a three-phase actuator.
Figure 7:
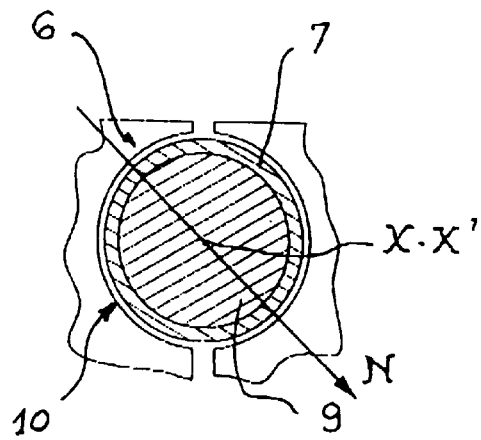
Figure 8:
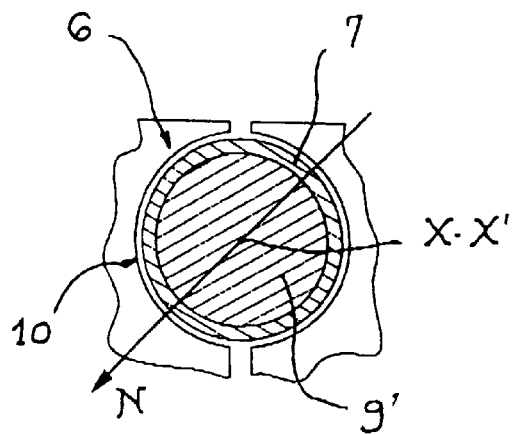

In the case of a three-phase actuator, three stators are provided aligned and the tube forming the rotor contains three permanent magnets, see FIGS 6–8. The polarities of these magnets may be provided to be offset angularly by about 120°. It would also be possible to provide an actuator with more than three stators, the number of magnets of the rotor in that case being adapted. Finally, angularly offset rotors may be provided, the polarities of the magnets in that case being overall aligned.

Although it has been described essentially with reference to an actuator for Jacquard system, the invention is also applicable to textile machines in general and, in particular, to weaving looms equipped with a dobby or to hosiery machines for controlling the needles.

What is claimed is:

1. An electrical apparatus for imparting motion to a harness cord of a weaving loom, the apparatus comprising:

an electrical actuator including a rotor defining an axis of rotation and a stator, said rotor including a hollow tube in which a plurality of permanent magnets each having opposite poles are mounted in generally axially spaced relationship with respect to one another along said axis of rotation, said plurality of permanent magnets being polarized alone a diametral direction with respect to said tube, said stator including a plurality of stator elements which are axially spaced from one another relative to said axis of rotation and each stator defining a separate air gap, each of said permanent magnets being disposed in said air gap of an adjacent stator, means adapted to connect said electrical actuator to said harness cord, said plurality of stator elements being aligned with respect to one another relative to said axis of rotation, and each of said plurality of permanent magnets are angularly offset with respect to one another about said axis of rotation by between approximately 60° to approximately 150°.

2. A weaving loom including a weaving system comprising:

an electrical actuator for imparting motion to a harness cord, said electrical actuator including a rotor defining an axis of rotation and a stator, said rotor including a hollow tube in which a plurality of permanent magnets each having opposite poles are mounted in generally axially spaced relationship with respect to one another along said axis of rotation, said plurality of permanent magnets being polarized along a diametrical direction with respect to said tube, said stator including a plurality of stator elements which are axially spaced from one another relative to said axis of rotation and each stator defining a separate air gap, each of said permanent magnets being disposed in said air gap of an adjacent stator, and means adapted for connecting said electrical actuator to said harness cord.

3. The weaving loom of claim 2 wherein said plurality of stator elements are aligned with respect to one another relative to said axis of rotation and at least one of said plurality of permanent magnets is angularly offset with respect to a second of said plurality of permanent magnets with respect to said axis of rotation.

4. The weaving loom of claim 3 wherein said plurality of permanent magnets are angularly offset with respect to one another about said axis of rotation by between approximately 60° to approximately 120°.

5. The weaving loom of claim 4 in which said plurality of permanent magnets are angularly offset approximately 90° with respect to one another.

6. The weaving loom of claim 3 in which said permanent magnets are angularly offset with respect to one another relative to said axis of rotation between approximately 90° to approximately 150°.

7. The weaving loom of claim 6 in which said permanent magnets are angularly offset at approximately 120° with respect to one another.

8. The weaving loom of claim 2 wherein said plurality of permanent magnets are generally angularly aligned relative to one another and with respect to said axis of rotation and said plurality of stator elements are angularly offset with respect to one another relative to said axis of rotation.

9. The weaving loom of claim 8 in which said plurality of stator elements are angularly offset with respect to one another about said axis of rotation between approximately 60° to approximately 120°.

10. The weaving loom of claim 9 in which said stator elements are angularly offset with respect to one another at approximately 90°.

11. The weaving loom of claim 8 in which said stator elements are angularly offset with respect to one another about said axis of rotation between approximately 90° to approximately 150°.

12. The weaving loom of claim 11 in which said stator elements are angularly offset with respect to one another at approximately 120°.

13. The weaving loom of claim 2 including means for axially spacing said plurality of permanent magnets with respect to one another.

14. The weaving loom of claim 2 wherein said rotor includes means adapted to cooperate with a braking device.

15. The weaving loom of claim 2 in which said rotor includes means adapted to cooperate with an angular position detector.

16. The weaving loom of claim 2 wherein said permanent magnets are fixed with respect to said tube so as to rotate therewith.

17. The weaving loom of claim 16 in which said permanent magnets are substantially cylindrical.

18. The weaving loom of claim 2 including bearing means for supporting said rotor relative to said means adapted to connect said electrical actuator to said harness cord.

19. An electrical apparatus for imparting motion to a harness cord of a weaving loom, the apparatus comprising:

an electrical actuator including a rotor defining an axis of rotation and a stator, said rotor including a hollow tube in which a plurality of permanent magnets each having opposite poles are mounted in generally axially spaced relationship with respect to one another along said axis of rotation, said plurality of permanent magnets being polarized along a diametral direction with respect to said tube, said stator including a plurality of stator elements which are axially spaced from one another relative to said axis of rotation and each stator defining a separate air gap, each of said plurality of permanent magnets being disposed in said air gap of an adjacent stator, means adapted to connect said electrical actuator to said harness cord, and said plurality of permanent magnets being generally angularly aligned relative to one another with respect to said axis of rotation and said plurality of stator elements being angularly offset with respect to one another relative to said axis of rotation.

* * * * *